United States Patent
Rabenko

(10) Patent No.: US 7,106,723 B2
(45) Date of Patent: Sep. 12, 2006

(54) DELAY REDUCTION METHOD FOR TELEPHONY SYSTEMS WITH MULTIPLE PACKET GENERATORS

(75) Inventor: Theodore F Rabenko, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 1085 days.

(21) Appl. No.: 09/874,127

(22) Filed: Jun. 6, 2001

(65) Prior Publication Data

US 2002/0018463 A1 Feb. 14, 2002

Related U.S. Application Data

(60) Provisional application No. 60/209,551, filed on Jun. 6, 2000.

(51) Int. Cl.
*H04L 12/66* (2006.01)
(52) U.S. Cl. ............... 370/352; 370/353; 370/356; 370/493; 370/494; 379/269.09; 379/88.17; 709/247
(58) Field of Classification Search ........ 370/352–356, 370/400–401, 473, 235, 471, 395.3, 412; 725/111; 710/56
See application file for complete search history.

(56) References Cited

U.S. PATENT DOCUMENTS

| | | | | |
|---|---|---|---|---|
| 5,905,727 A | * | 5/1999 | Christensen et al. | 370/395.3 |
| 6,075,784 A | * | 6/2000 | Frankel et al. | 370/356 |
| 6,088,745 A | * | 7/2000 | Bertagna et al. | 710/56 |
| 6,219,339 B1 | * | 4/2001 | Doshi et al. | 370/235 |
| 6,304,567 B1 | * | 10/2001 | Rosenberg | 370/356 |
| 6,389,038 B1 | * | 5/2002 | Goldberg et al. | 370/471 |
| 6,907,042 B1 | * | 6/2005 | Oguchi | 370/412 |

FOREIGN PATENT DOCUMENTS

GB 2 322 516 8/1998

OTHER PUBLICATIONS

Cable Television Laboratories, Data-Over-Cable Service Interface Specifications Radio Frequency Interface Specifiction SP-RF1V1. 1-102-990731, Interim Specification, dated 1999, pp. 2-6 & 103-115.*
Copy of International Search Report from PCT Appl. No. PCT/US01/18200, mailed Apr. 4, 2002, 7 pages.

(Continued)

*Primary Examiner*—Doris H. To
*Assistant Examiner*—Robert W. Wilson
(74) *Attorney, Agent, or Firm*—Sterne Kessler Goldstein & Fox PLLC

(57) ABSTRACT

A telephony system and method is provided that reduces delay and provides better utilization of upstream bandwidth in delivering packet telephony services to a plurality of subscriber lines via a cable modem system. An exemplary system includes a plurality of voice processing modules, a host processor, and a buffer. Each voice processing module receives digital voice signals from a separate set of subscriber lines, compresses the digital voice signals to generate a voice packet, and transfers the voice packet to the buffer. The host processor then assembles a packet by concatenating the voice packets and transmits the assembled packet for delivery over a data network. Because the plurality of voice processing modules process the voice packets in parallel, delay is reduced in the assembly and transmission of the assembled packet.

25 Claims, 8 Drawing Sheets

OTHER PUBLICATIONS

Hoshi et al., "Proposal of a Method of Voice Stream Multiplexing for IP Telephony Systems", Internet Workshop, Feb. 18, 1999, pp. 182-188.

Gun Seo et al., "An Implementation of VoIP Cable Modem", Tencon 99, Proceedings of the IEEE Region 10 Conference, Cheju Island, South Korea, Sep. 15-17, 1999, pp. 1532-1535.

Saito, H., "Bandwidth Management in AAL2 Networks", Proceedings of the International Teletraffic Congress, Jun. 7-11, 1999, vol. 3A, pp. 365-374.

Sriram et al., "Voice over ATM Using AAL2 and Bit Dropping: Performance and Cell Admission Control", IEEE Journal on Selected Areas in Communications, vol. 17, No. 1, Jan. 1999, pp. 18-28.

* cited by examiner

DELAY REDUCTION METHOD FOR TELEPHONY SYSTEMS WITH MULTIPLE PACKET GENERATORS

CROSS-REFERENCE TO RELATED APPLICATIONS

This application claims priority to the following provisional application:

U.S. Patent Ser. No. 60/209,551, entitled "Delay Reduction Method for Telephony Systems with Multiple Packet Generators," filed Jun. 6, 2000, by Rabenko, (still pending) (incorporated by reference in its entirety herein).

BACKGROUND OF THE INVENTION

1. Field of the Invention

The present invention is directed to telephony systems. More particularly, the present invention is directed to systems and methods for providing telephony services to a plurality of subscriber lines over a packet network.

2. Background

High speed data networks, such as the Internet, have emerged as viable platforms for the delivery of telephony services. For example, cable operators are currently utilizing hybrid fiber-coaxial (HFC) networks to deliver packet telephony services to subscribers via residential cable modems. It is anticipated that cable modem systems will enable the deployment of telephony services in a manner that is less costly than existing circuit-switched alternatives, as well as permit the delivery of unique value-added features, such as integrated voice mail and e-mail messaging.

The North American telephone market includes both single family dwellings and multiple dwelling units. According to conventional industry usage, the abbreviation "MDU" is used to refer both to multiple dwelling units as well as to the telephony equipment used to service them. For the sake of clarity, throughout the rest of this document the term "MDU" will be used exclusively to refer to multiple dwelling units themselves, whereas the terms "MDU equipment," "MDU system," or "MDU telephony system" will be used to refer to the telephony equipment used in servicing them.

The demand for subscriber circuits in MDU applications comprises approximately 30% of all telephony installations. However, conventional deployments of voice telephony services using cable modem systems are supported entirely by equipment designed to meet the requirements of single family dwellings. For example, a conventional cable modem device adapted for delivering voice telephony services over an HFC network is designed to support only a limited number of subscriber lines, such as four subscriber lines, per cable modem. (As used herein, the term "subscriber line" generally refers to the line that connects a customer's telephone to one or more interfaces to a high speed data network.) Consequently, a device of this type is not suitable for deploying telephony services in an MDU with a large number of subscriber lines, such as in an apartment or other high-density structure. Although multiple devices of this type could be used to support a greater number of subscriber lines, such a deployment would be prohibitively expensive in light of the cost of the devices.

Furthermore, conventional cable modem devices for delivering voice telephony services over an HFC network utilize a single digital signal processor (DSP) for processing voice signals from one or more subscriber lines for transmission over the HFC network. Because a single DSP is used, each voice channel must be processed serially. Thus, if conventional devices were utilized to support a larger number of subscriber lines, the single DSP would act as a bottleneck, causing transmission delay that would cause a reduction in Quality of Service (QOS). A much more powerful DSP would have to be utilized in order to process a larger number of subscriber lines while maintaining a transmission rate that would not cause call quality to suffer. The use of a very powerful DSP, however, would cause a dramatic increase in the cost overall cost of the device.

What is desired, then, is a system and method for delivering packet telephony services via a cable modem system that is capable of supporting a greater number of subscriber lines per cable modem. Furthermore, the desired system and method should reduce delay in the processing of voice packets and provide for improved bandwidth utilization so that a satisfactory packet transmission rate, and therefore QOS, may be maintained. In addition, the desired system and method should be cost efficient, providing more attractive cost per line characteristics than conventional systems and methods for delivering packet telephony services via a cable modem system.

BRIEF SUMMARY OF THE INVENTION

The present invention is directed to a telephony system and method that reduces delay and improves network bandwidth utilization in delivering packet telephony services to a plurality of subscriber lines. Embodiments of the present invention permit such services to be delivered in a cost-efficient manner.

In embodiments, the system includes a first audio processing module and a first voice processing module coupled to a first set of subscriber lines, a second audio processing module and a second voice processing module coupled to a second set of subscriber lines, a host processor, and a buffer. The first audio processing module receives first analog voice signals from one of the first set of subscriber lines and converts the first analog voice signals into first digital voice signals. The first voice processing module receives the first digital voice signals, compresses them to generate a first voice packet, and transfers the first voice packet to the buffer. The second audio processing module receives second analog voice signals from one of the second plurality of subscriber lines and converts the second analog voice signals into second digital voice signals. The second voice processing module receives the second digital voice signals, compresses them to generate a second voice packet, and transfers the second voice packet to the buffer. The host processor then assembles a packet from the first voice packet and the second voice packet and transmits the assembled packet for delivery over a data network. In embodiments of the present invention, the first voice processing module and the second voice processing module generate the first voice packet and the second voice packet in parallel, thereby reducing delay in the assembly and transmission of the assembled packet.

In further embodiments of the present invention, the host processor transmits the assembled packet for delivery over an HFC network. Furthermore, the host processor may transmit the assembled packet for delivery over an HFC network during an assigned upstream burst opportunity.

In alternate embodiments, the first voice processing module and the second voice processing module each comprise a digital signal processor.

The invention is advantageous in that it permits packet telephony services to be delivered to a plurality of subscriber lines via a single cable modem.

The invention is further advantageous in that it reduces delay in the delivery of packet telephony services to a plurality of subscriber lines via a cable modem system.

The invention is also advantageous in that it provides for improved utilization of network bandwidth in delivering packet telephony services to a plurality of subscriber lines via a cable modem system.

Another benefit of the invention is that it provides a reduced-cost alternative for providing packet telephony services to a plurality of subscriber lines via a cable modem system.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
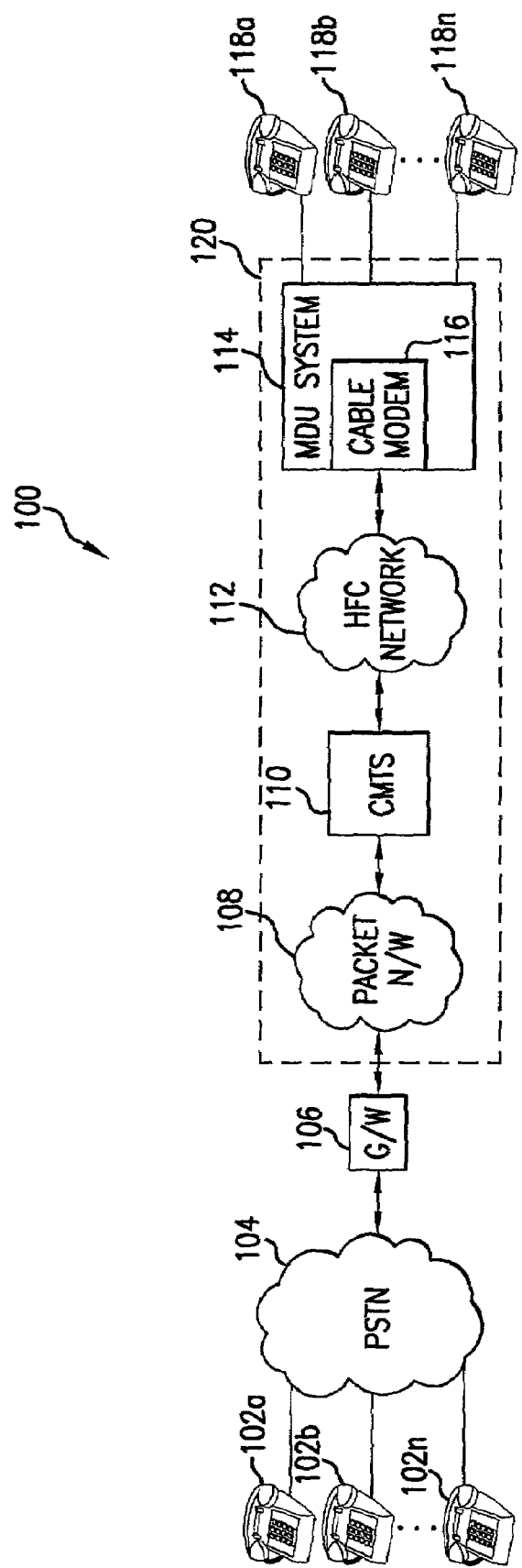
FIG. 1 depicts an exemplary telephony system within which embodiments of the present invention may operate.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

A. Overview of the Invention

The present invention is generally directed to a system and method for delay reduction and improved bandwidth utilization in the delivery of telephony services over packet networks to a plurality of subscriber lines. The present invention is particularly applicable to packet networks with reservation-based transmission capabilities, such as cable modem systems and fixed wireless systems, as will be described in detail herein. For example, the present invention will reduce delay and improve bandwidth utilization in a cable modem system wherein a single cable modem is utilized to deliver voice telephony services to a plurality of subscriber lines. Accordingly, the present invention may be advantageously utilized to deliver telephony services to multiple dwelling units (MDUs).

B. Example Operating Environment

FIG. 1 depicts an exemplary telephony system 100 within which embodiments of the present invention may operate. The exemplary telephony system 100 permits telephone communication to be carried out between any of a first plurality of telephony devices 102a through 102n, depicted on the left side of FIG. 1, and any of a second plurality of telephony devices 118a through 118n, depicted on the right side of FIG. 1. The telephony devices 102a through 102n and 118a through 118n may include telephones, facsimile machines, or any other type of telephony device adapted for communicating voice signals over a circuit-switched or packet-switched network. For the purposes of this example, each of the telephony devices 118a through 118n are assumed to be attached to a different subscriber line within the same MDU.

As shown in FIG. 1, the exemplary telephony system 100 includes both a public switched telephone network (PSTN) 104 for providing circuit-switched telephony services to telephony devices 102a through 102n and a packet telephony system 120 for providing packet-based telephony services to telephony devices 118a through 118n at the MDU. The PSTN 104 and the packet telephony system 120 are connected by means of a network gateway 106. The network gateway 106 facilitates telephone communication between the networks by operating to convert analog voice signals received from the PSTN 104 to digital voice packets suitable for transmission via the packet telephony system 120 and to convert digital voice packets received from the packet telephony system 120 to analog voice signals suitable for transmission via the PSTN 104.

The packet telephony system 120 provides for the communication of voice packets based on a bi-directional transfer of Internet protocol (IP) traffic between a packet network 108, which may include the Internet, and an MDU telephony system 114, which delivers voice telephony services to the plurality of telephony devices 118a–118n. To this end, the packet telephony system 120 incorporates a cable modem system comprising a cable modem termination system (CMTS) 110, a hybrid fiber-coaxial (HFC) network 112, and a cable modem 116. As depicted in FIG. 1, the cable modem 116 is an integral part of the larger MDU telephony system 114 that controls the processing and transmission of voice packets to and to and from the plurality of subscriber lines supporting telephony devices 118a through 118n.

The CMTS 110 is a device typically located at a cable headend that controls the upstream and downstream transfer of data between itself and the cable modem 116, as well as any other cable modems to which it may be attached by means of the HFC network 112. (In the context of a cable modem system, the term "downstream" generally refers to a transmission from the CMTS to a cable modem, while the term "upstream" generally refers to a transmission from a cable modem to the CMTS). In particular, the CMTS 110 controls the upstream transfer of information by assigning short periodically-scheduled transmission opportunities to the cable modem 116. Because the cable modem 116 can only transmit information during these reserved time periods, cable modem systems may be considered reservation-based transmission systems. The CMTS 110 further operates to modulate and terminate RF signals going to and coming from the HFC network 112, and bridges these to a more generic type of data transport to connect with the packet network 108.

The HFC network 112 provides for the high-speed, reliable, and secure transport of data between the CMTS 110 at the cable headend and the cable modem 116 at the MDU. As will be understood by persons of ordinary skill in the relevant art(s), the HFC network 112 may comprise coaxial cable, fiberoptic cable, or a combination of coaxial cable and fiberoptic cable linked via one or more fiber nodes.

The cable modem 116 is a device within the MDU telephony system 114 that operates as an interface between the plurality of customer subscriber lines attached to the telephony devices 118a through 118n and the HFC network 112 for the delivery of packet telephony services. In particular, the cable modem 16 transfers voice packets to and from the HFC network 112 in compliance with the DOCSIS specification published by CableLabs.

As shown in the exemplary telephony system 100, the single cable modem 116 may be required to support a potentially large number of subscriber lines. Accordingly, the MDU telephony system 114 of the present invention is designed to reduce delay in the processing of voice packets from the plurality of subscriber lines and to provide for improved upstream bandwidth utilization in transferring voice packets from the MDU telephony system 114 to the CMTS 110 over the HFC network 112. Embodiments of the present invention thereby ensure acceptable telephone call quality by maintaining a sufficiently high packet transmission rate. Furthermore, embodiments of the present invention may achieve these goals in a cost efficient manner. An MDU telephony system in accordance with the present invention will now be described in more detail.

C. MDU Telephony System in Accordance with Embodiments of the Present Invention

An MDU telephony system in accordance with embodiments of the present invention will reduce delay and improve upstream bandwidth utilization where telephony services are delivered to multiple subscriber lines via a single cable modem. As will be described herein, these objectives are achieved, in part, through the use of multiple audio processing modules and voice processing modules for simultaneously generating voice packets from a plurality of subscriber lines, in conjunction with the use of concatenation techniques for combining multiple voice packets into a single upstream burst for transmission. Accordingly, embodiments of the present invention are well-suited for providing packet telephony services to a MDU.

Figure 2A:
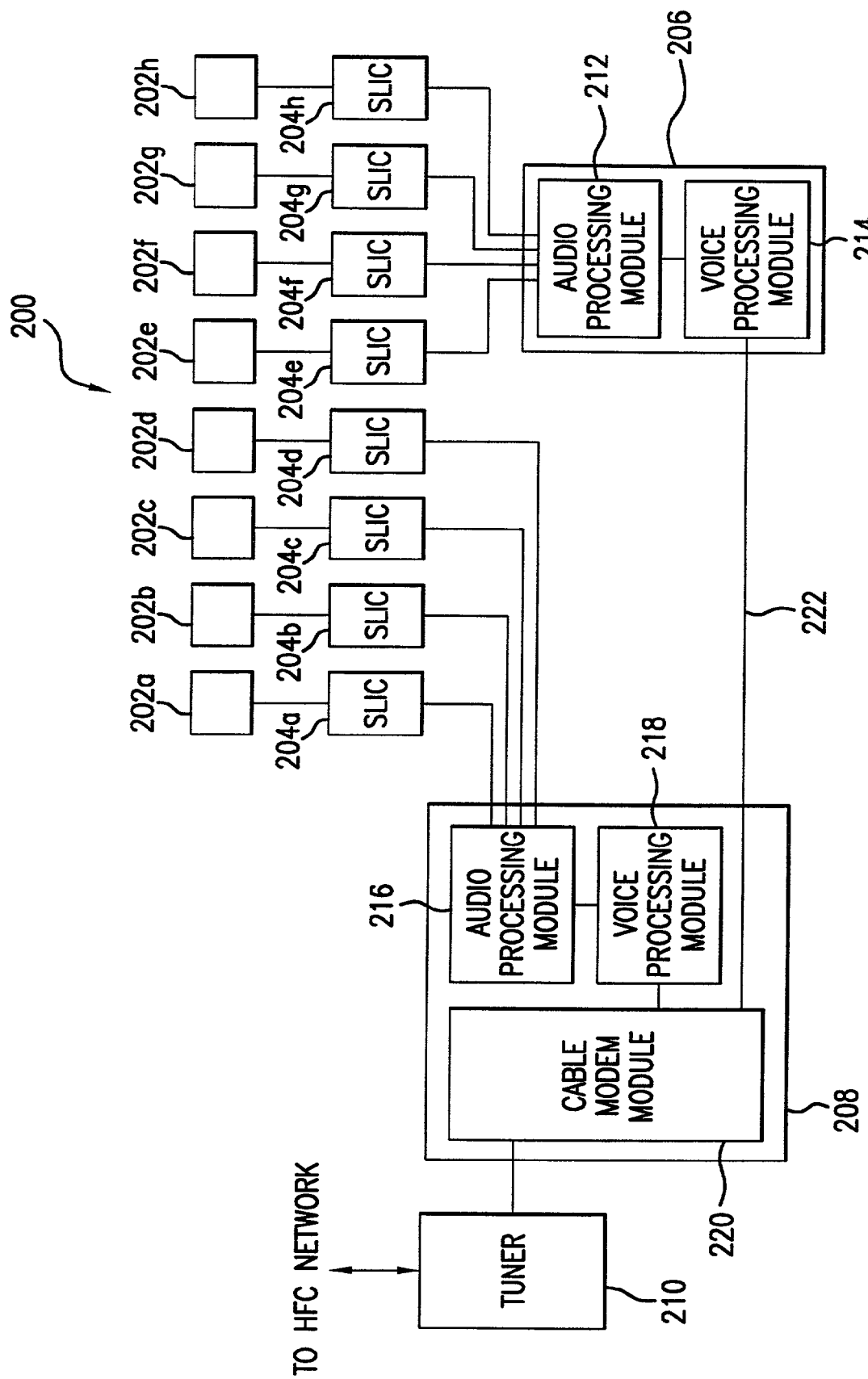
FIGS. 2A, 2B and 2C illustrate alternate example MDU telephony systems in accordance with embodiments of the present invention.

FIG. 2A illustrates an exemplary MDU telephony system 200 in accordance with embodiments of the present invention. The exemplary MDU telephony system 200 operates to efficiently deliver packet telephony services to up to 8 subscribers simultaneously. However, as will be discussed in more detail herein, the present invention is capable of supporting many more subscriber lines. The size of the MDU telephony system 200 is limited in this description for the sake of clarity.

The example MDU telephony system 200 includes a plurality of telephone connection interfaces 202a–202h, a plurality of subscriber line interface circuits (SLICs) 204a–204h, a voice and audio processing module (VAPM) 206, an integrated VAPM and cable modem (CM) 208, and a cable tuner 210.

The telephone connection interfaces 202a–202h each comprise a device for connecting a telephone, or other telephony device, to the MDU telephony system 200. In embodiments, each telephone connection interface 202a–202h comprises a standard RJ-11 jack for connecting a POTS (Plain Old Telephone Service) telephony device, such as a POTS phone or fax machine, to a subscriber line for the delivery of telephony services. However, as will be appreciated by persons skilled in the art, various other devices may be used to implement the telephone connection interfaces 202a–202h, including but not limited to any appropriate connection means for connecting a telephony device to a subscriber line.

As illustrated in FIG. 2A, each of the telephone connection interfaces 202a–202h is coupled via a subscriber line to a corresponding SLIC 204a–204h. In embodiments, each SLIC 204a–204e comprises a well-known integrated circuit for performing some or all of the POTS interface functions used in delivering standard POTS service to a telephony device attached to each of the telephone connection interfaces 202a–202h. For example, in embodiments, each SLIC 202a–202h provides power and ringing signals to the attached subscriber line, provides signaling functionality, and monitors subscriber line conditions.

As further illustrated in FIG. 2A, the four SLICs 204a, 204b, 204c, and 204d are each coupled to the integrated VAPM and CM 208 and the four remaining SLICs 204e, 204f, 204g and 204h are each coupled to the VAPM 206. Both the integrated VAPM and CM 208 and the VAPM 206 comprise an audio processing module and a voice processing module that operate to convert analog voice signals received from the SLICs into digital voice packets for delivery over an HFC network (not shown) and, conversely, to convert digital voice packets received from the HFC network to analog voice signals for transmission over the plurality of subscriber lines.

In particular, the integrated VAPM and CM 208 comprises an audio processing module 216, a voice processing module 218, and a cable modem module 220. The audio processing module 216 performs the analog-to-digital (A/D) conversion of voice signals received from the SLICs 204a, 204b, 204c, and 204d, and the digital-to-analog (D/A) conversion of voice signals received from the voice processing module 218. In embodiments, the audio processing module 216 comprises four CODECs, each of which corresponds to one of the four voice channels associated with the SLICs 204a, 204b, 204c and 204d., for performing D/A and A/D conversion of voice signals. In further embodiments, each CODEC comprises an integrated circuit for performing signal conversion functions.

The voice processing module 218 performs the compression of digital voice signals received from the audio processing module 216 and the decompression of digital voice signals received from the cable modem module 220. In embodiments, the voice processing module 218 comprises a digital signal processor for performing compression and decompression of digital voice signals. In further embodiments, the voice processing module 218 performs compression and decompression in accordance with one or more standard compression/decompression techniques, including but not limited to the G.711, G.723.1, G.726 and G.729 standards.

The cable modem module 220 within the integrated VAPM and CM 208 includes a cable modem and additional components for providing an interface to the HFC network and for bridging the voice packets to the data network for transfer in compliance with the DOCSIS specification. In particular, the cable modem module 220 operates to transfer voice packets from the voice processing module 218 to the HFC network and from the HFC network to the voice processing module 218. As shown in FIG. 2A, the cable modem module 220 transfers voice packets to and from the external HFC network via the cable tuner 210. In embodiments, the cable tuner 210 is a CMOS tuner.

In embodiments, the integrated VAPM and CM 208 comprises a Broadcom BCM 3352 QAMLINK™ Single-Chip 4-Channel VoIP Residential Gateway, manufactured by Broadcom Corporation of Irvine, Calif.

Like the integrated VAPM and CM 208, the VAPM 206 also includes an audio processing module (audio processing module 212) and a voice processing module (voice processing module 214) for processing voice packets for delivery to and from any of four different subscriber lines. The audio processing module 212 and the voice processing module 214 are substantially the same as the audio processing module 216 and the voice processing module 218 described in reference to the integrated VAPM and CM 208, above, except that the audio processing module 212 and the voice processing module 214 process voice data for transfer between the SLICs 204e, 204f, 204g and 204h and the cable modem module 220, as illustrated in FIG. 2A. Packets are communicated between the VAPM 206 and the integrated VAPM and CM 208 via an external expansion bus 222.

In embodiments, the VAPM 206 comprises a Broadcom MDU DSP, part number BCM 3341, manufactured by Broadcom Corporation of Irvine, Calif.

Figure 2B:
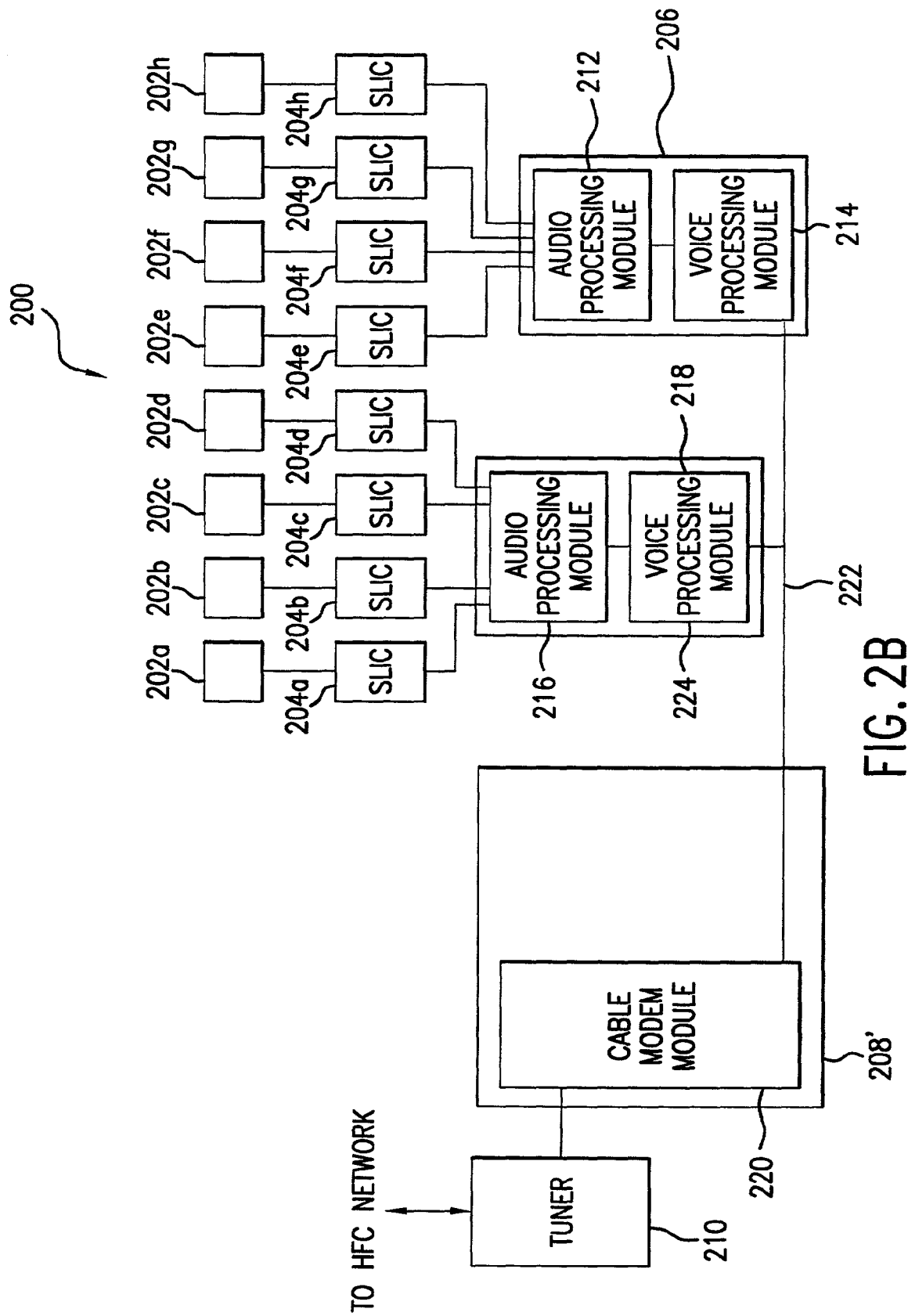

It should be noted that the present invention is not limited to embodiments in which the audio processing module 216 and the voice processing module 218 are incorporated with a cable modem as part of a single integrated device. For example, FIG. 2B illustrates an alternate embodiment of the MDU telephony system 200 in which the audio processing module 216 and the voice processing module 218 may comprise a separate VAPM 224 that is coupled to a cable modem device 208' via the expansion bus 222. In the alternate embodiment of the MDU telephony system 200 of FIG. 2B, the cable modem device 208' may comprise a Broadcom BCM 3350 QAMLINK™ Single Chip Cable Modem or any of the Broadcom integrated cable modem devices designated with part numbers BCM 3345, BCM 3360 or BCM 3370, manufactured by Broadcom Corporation of Irvine, Calif. Additionally, in the alternate embodiment of the MDU telephony system 200 of FIG. 2B, the VAPM 224 may comprise a Broadcom BCM MDU DSP, part number BCM 3341, manufactured by Broadcom Corporation of Irvine, Calif.

As will be described further herein, the use of multiple audio processing modules, such as the audio processing modules 212 and 216, and multiple voice processing modules, such as the voice processing modules 214 and 218, in the example MDU telephony system 200 permit voice packets to be generated in parallel from the first set of subscriber lines 202a–d and from the second set of subscriber lines 202e–202h. These voice packets are then concatenated into a single assembled packet for upstream transmission by the cable modem module 220.

Figure 2C:
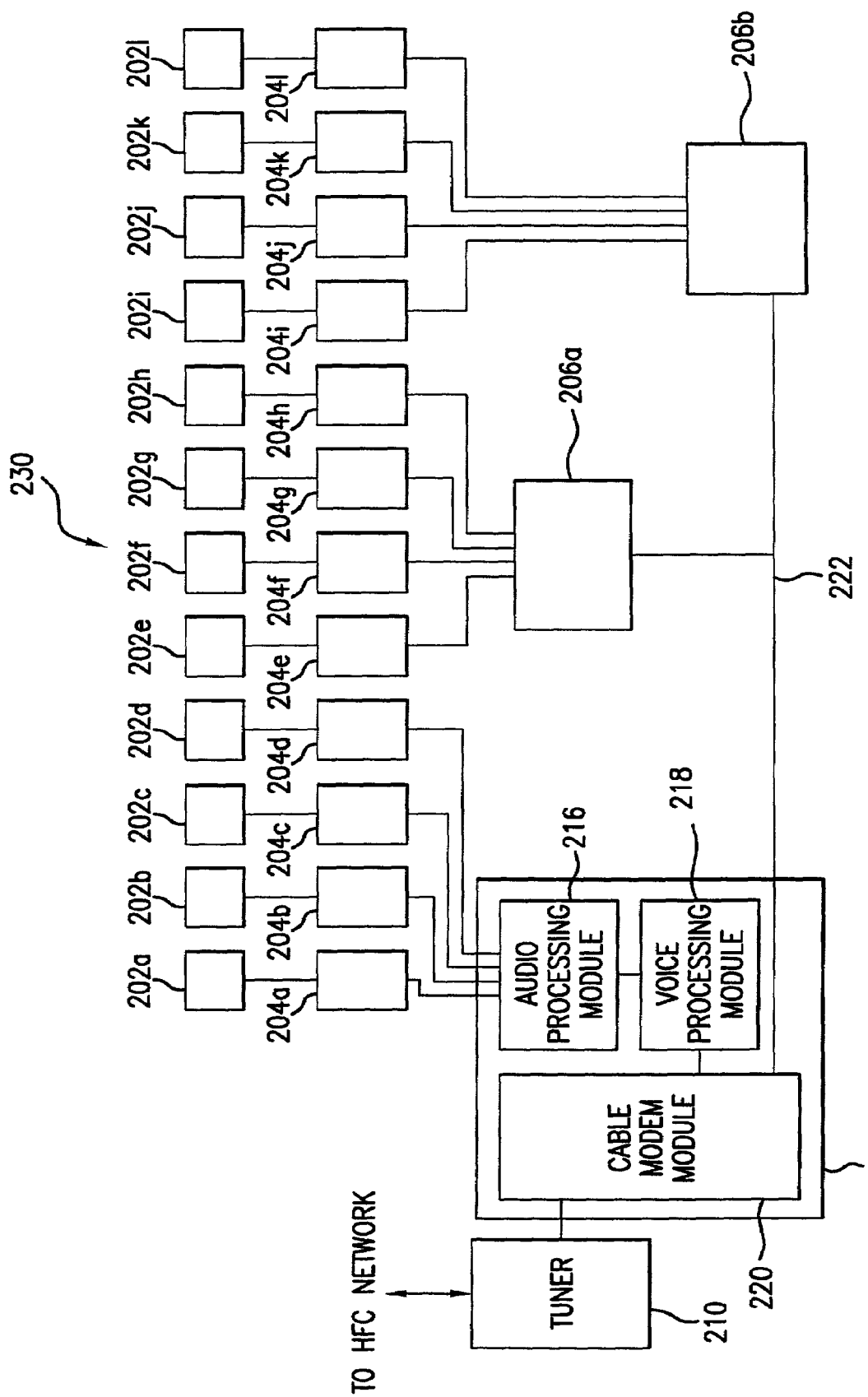

FIG. 2C illustrates an alternate exemplary MDU telephony system 230 in accordance with embodiments of the present invention. The alternate exemplary MDU telephony system 230 is similar to the system 200 illustrated in FIG. 2A, except that the exemplary MDU telephony system 230 has been adapted to deliver packet telephony services to up to 12 subscribers simultaneously, rather than 8. This has been achieved through the use of two VAPMs, 206a and 206b, rather than one. Each of the VAPMs, 206a and 206b, comprises a separate audio processing module and a voice processing module for processing four channels of voice data and is essentially the same as the VAPM 206 described in reference to FIG. 2A, above. Both VAPMs 206a and 206b are coupled to the cable modem module 220 via the expansion bus 222.

As illustrated in FIG. 2C, the use of an additional VAPM allows for four more subscriber lines to be supported by the exemplary MDU telephony system 230. These four additional subscriber lines are implemented through the use of four additional telephone connection interfaces 202i, 202j, 202k, and 202l, and four additional SLICs 204i, 204j, 204k and 204i. However, the present invention is not limited to a particular number of subscriber lines, a particular number of VAPMs, or a particular ratio of subscriber lines to VAPMs. As will be appreciated by persons of ordinary skill in the art from the teachings provided herein any number of subscriber lines, VAPMs, and subscriber lines per VAPM can be used to practice the present invention.

D. Voice Packet Processing and Transmission in Accordance with Embodiments of the Present Invention The technique by which voice packets are processed and transmitted in accordance with embodiments of the present invention will now be described. The description will be made with continued reference to the exemplary MDU telephony system 230 of FIG. 2C. As discussed above, the exemplary MDU telephony system 230 efficiently delivers packet telephony services to up to 12 subscriber lines through the use of an integrated VAPM and CM 208 and two VAPMs 206a and 206b. However, the technique of the present invention is not limited to this exemplary embodiment.

Figure 3:
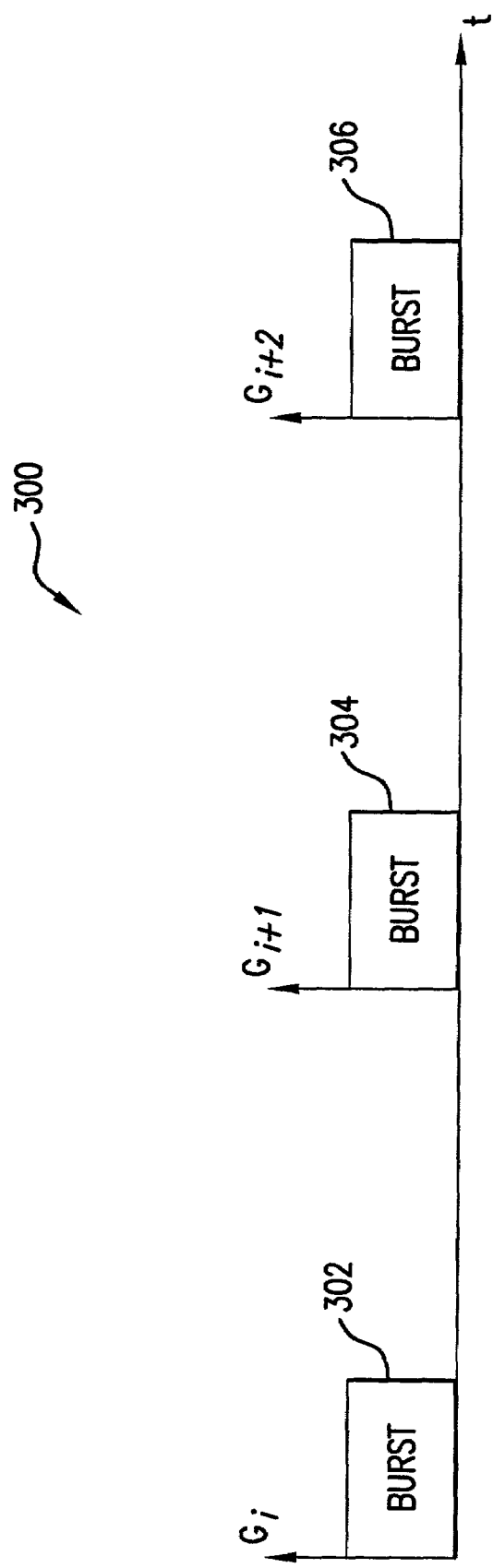
FIG. 3 illustrates upstream burst timing for a cable modem portion of an MDU telephony system in accordance with embodiments of the present invention.

In accordance with the DOCSIS specification, a cable modem may only transmit data upstream in short transmissions, called bursts, during transmission opportunities assigned to it by the CMTS. Where telephony services are being provided, it is anticipated that the burst opportunities will arrive at a dependable periodic interval. FIG. 3 is a timing diagram 300 that illustrates an example series of upstream burst opportunities for the cable modem module 220 within the integrated VAPM and CM 208. The timing diagram 300 shows three example burst opportunities, 302, 304 and 306, occurring at times $G_i$, $G_{i+1}$ and $G_{i+2}$, which together define a dependable periodic interval. To utilize each burst opportunity the cable modem module 220 must have data ready for transmission before times $G_i$, $G_{i+1}$ and $G_{i+2}$. Thus, the finite intervals between the burst opportunities 302, 304 and 306 delineate the rate at which data may be transmitted upstream by the cable modem module 220. In embodiments of the present invention, the transmission intervals may be roughly 10 milliseconds apart.

Embodiments of the present invention take advantage of the fact that DOCSIS bursts arrive at a dependable periodic interval to align the processing and assembly of voice packets from multiple voice processing modules with the scheduled transmission opportunities. By concatenating the voice packets into a single DOCSIS packet, an MDU telephony system in accordance with the present invention is capable of transmitting multiple telephone channels during a single DOCSIS upstream burst instead of one, thereby providing for better utilization of upstream bandwidth.

For example, the MDU telephony system 230 of FIG. 2C is capable of transmitting three telephone channels during a single DOCSIS upstream burst. This is because the MDU telephony system 230 is capable of simultaneously processing and assembling a voice packet from each of the three different voice processing modules associated with the integrated VAPM and CM 208, the VAPM 206a and the VAPM 206b. In particular, the MDU telephony system 230 periodically assembles a packet for upstream transmission that includes a plurality of voice packets: one from the voice processing module 218 within the integrated VAPM and CM 208, one from the voice processing module within the first VAPM 206a, and one from the voice processing module within the second VAPM 206b.

Figure 4:
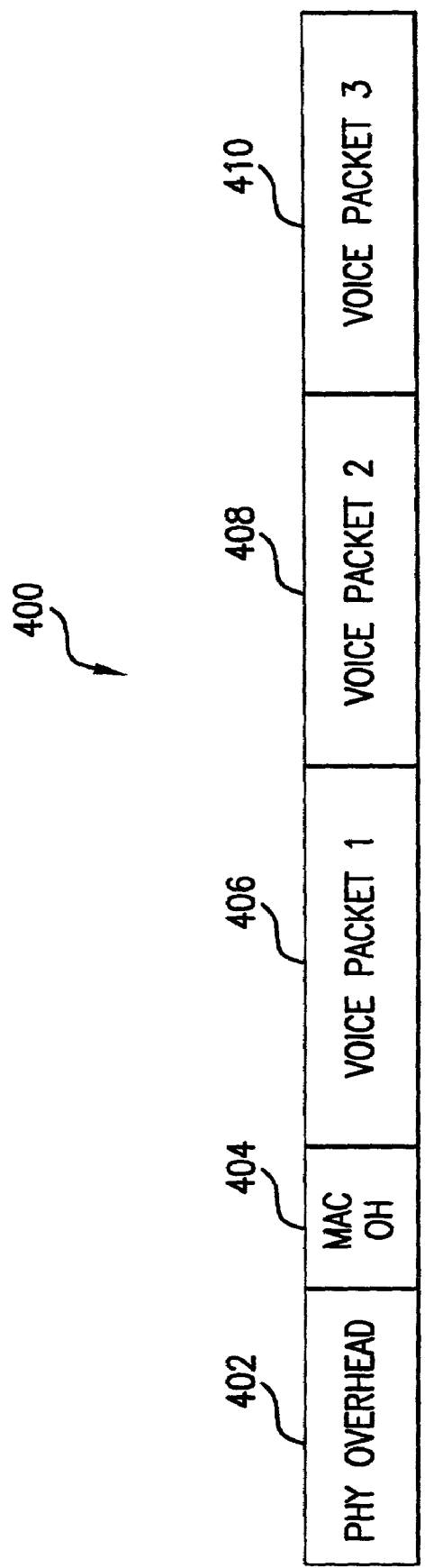
FIG. 4 illustrates an assembled packet for upstream transmission in accordance with embodiments of the present invention.

FIG. 4 illustrates the format of an example assembled packet 400 for upstream transmission in accordance with embodiments of the present invention. The example assembled packet 400 includes physical layer (PHY) overhead 402, media access layer (MAC) overhead 404, a first voice packet 406, a second voice packet 408, and a third voice packet 410.

The PHY overhead 402 comprises information necessary for the RF transmission and reception of the burst and may include, for example, a preamble or training sequence that permits a CMTS at the cable headend to "lock on" to the burst and demodulate the transmitted signal. The MAC overhead 404 comprises header information necessary for transferring data in accordance with the DOCSIS protocol, and may include, for example, a frame control field (1 byte), a MAC_PARM field (1 byte), a LEN (SID) field (2 bytes), an EHDR field (0–240 bytes), and a Header Check Sequence (HCS) field (2 bytes). The PHY overhead 402 and the MAC overhead 404 are both defined in the DOCSIS 1.1 specification and are well known in the art.

As shown in FIG. 4, the payload of the example assembled packet 400 includes three voice packets concatenated together for transmission in a single upstream burst: a first voice packet 406, a second voice packet 408, and a third voice packet 410. These voice packets may be concatenated in accordance with the concatenation provisions of the DOCSIS 1.1 specification.

In accordance with embodiments of the present invention, each of these voice packets originates from a different voice processing module servicing a different set of subscriber lines. For example, the first voice packet 406 may originate from the voice processing module 218 within the integrated VAPM and CM 208 that services the four subscriber lines coupled to the SLICs 204a, 204b, 204c, and 204d. Likewise, the second voice packet 408 may originate from the voice processing module within the VAPM 206a that services the four subscriber lines coupled to the SLICs 204e, 204f, 204g and 204h. Finally, the third voice packet 410 may originate from the voice processing module within the VAPM 206b that services the four subscriber lines coupled to the SLICs 204i, 204j, 204k, and 204l.

By concurrently processing voice packets from more than one voice processing module, embodiments of the present invention permit a plurality of voice channels to be transmitted in a single upstream burst without requiring a concomitant increase in processing speed for any of the voice processing modules. For example, in regard to the MDU telephony system 230, three voice channels may be transmitted in a single upstream burst. However, each of the three voice processing modules are required to contribute only as single voice packet in advance of each burst opportunity. Accordingly, in embodiments of the present invention, each of the voice processing modules may be implemented using processors sized as though the system were one third smaller, resulting in a more cost-efficient design.

Figure 5:
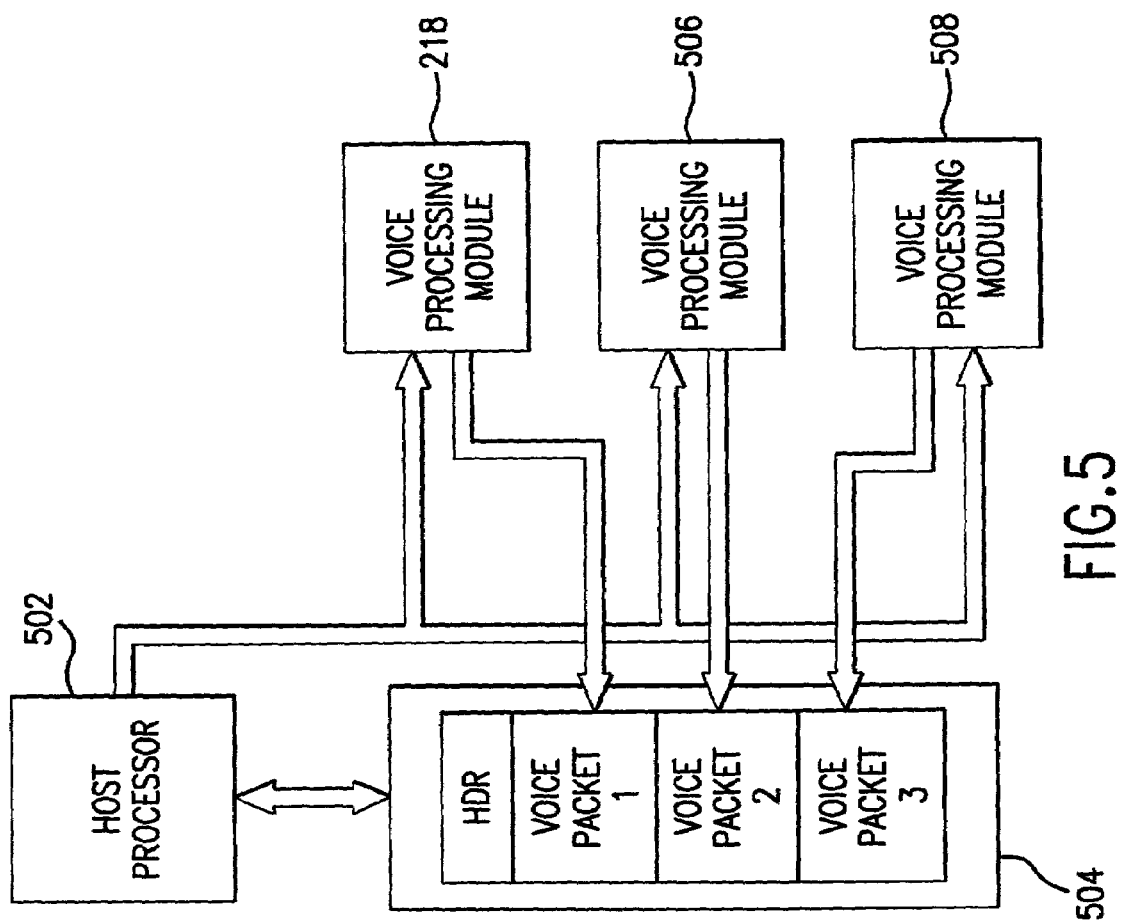
FIG. 5 depicts a portion of an example MDU telephony system in accordance with embodiments of the present invention.

FIG. 5 depicts a portion of an MDU telephony system in accordance with embodiments of the present invention. The portion of the MDU telephony system illustrated in FIG. 5 includes a host processor 502, a transmission buffer memory 504, the voice processing module 218, which is part of integrated VAPM and CM 208, a voice processing module 506, which represents the voice processing module within the VAPM 206a, and a voice processing module 508, which represents the voice processing module within the VAPM 206b.

The host processor 502 resides within the cable modem module 220 and controls the transfer of voice packets from the three voice processing modules, as well as the assembly and upstream transmission of assembled packets over the HFC network. In alternate embodiments of the present invention, the host processor 502 resides within the integrated VAPM and CM 208 but is located external to the cable modem module 220. In further embodiments, the host processor 502 comprises a 32-bit MIPS® processor. However, the invention is not so limited, and the host processor 502 may comprise any suitable microprocessor for performing the functions described herein.

The transmission buffer memory 504 comprises a memory utilized by the host processor for assembling packets for upstream transmission. In embodiments, the transmission buffer memory 504 resides within the cable modem module 220. In alternate embodiments, the transmission buffer memory 504 resides in an external memory module coupled to the integrated VAPM and CM 208. In either case, the transmission buffer memory 504 is accessible to the host processor 502 as well as the voice processing modules 218, 506, and 508, as shown in FIG. 5.

In accordance with the technique of the present invention, the host processor 502 collects voice packets from the voice processing modules 218, 506, and 508 at periodic intervals, assembles them into an assembled packet in a buffer within the transmission buffer memory 504, and transmits the assembled packet upstream during an assigned upstream burst opportunity.

The host processor 502 assembles the packet for upstream transmission by constructing the necessary header information in a buffer within the transmission buffer memory 504 and controlling the transfer of voice packets from the voice processing modules 218, 506 and 508.

In embodiments, the host processor 502 controls the transfer of voice packets from the voice processing modules 218, 506 and 508 using DMA (Direct Memory Access) transfers. In such embodiments, since the host processor 502 is responsible for assembling the packet for upstream transmission in accordance with the DOCSIS specification, the host processor calculates the overall length of the assembled packet and determines the necessary starting location for each voice packet that will comprise a portion of its payload. The host processor 502 then assigns a DMA pointer to each voice processing module that points to the predetermined starting location for each voice packet in the buffer within the transmission buffer memory 504. After each voice processing module has completed processing of a voice packet, it will perform a DMA transfer of the voice packet to the transmission buffer memory 504.

In alternate embodiments, the host processor 502 controls the transfer of voice packets from the voice processing modules 218, 506 and 508 using segmented, or linked-list, DMA transfers. As will be appreciated by those of ordinary skill in the pertinent art(s), in such embodiments, the voice processing modules transfer the voice packets to non-contiguous areas within the transmission buffer memory 504 using pointers provided by the host processor 502. The voice packets are subsequently linked together by the host processor 502 to generate an assembled packet for upstream transmission.

In embodiments of the present invention, the voice processing modules 218, 506 and 508 operate in parallel, so that each will generate a voice packet for upstream transmission during substantially the same time period. Consequently, the combined delay attributable to the voice processing modules 218, 506, and 508 will be only the time required for a single voice processing module to generate a voice packet.

Once a complete packet comprising a header and a payload including three voice packets (one from each voice processing module) has been assembled in the transmission buffer memory 504, the host processor 502 then causes the assembled packet to be transferred from the transmission buffer memory 504 to the necessary upstream transmission equipment for transmission over the HFC network. In embodiments, the assembly of the voice packet is temporally aligned with the arrival of an assigned upstream burst opportunity, such that the assembled packet is transmitted during the assigned burst opportunity that arrives after assembly has completed.

Figure 6:
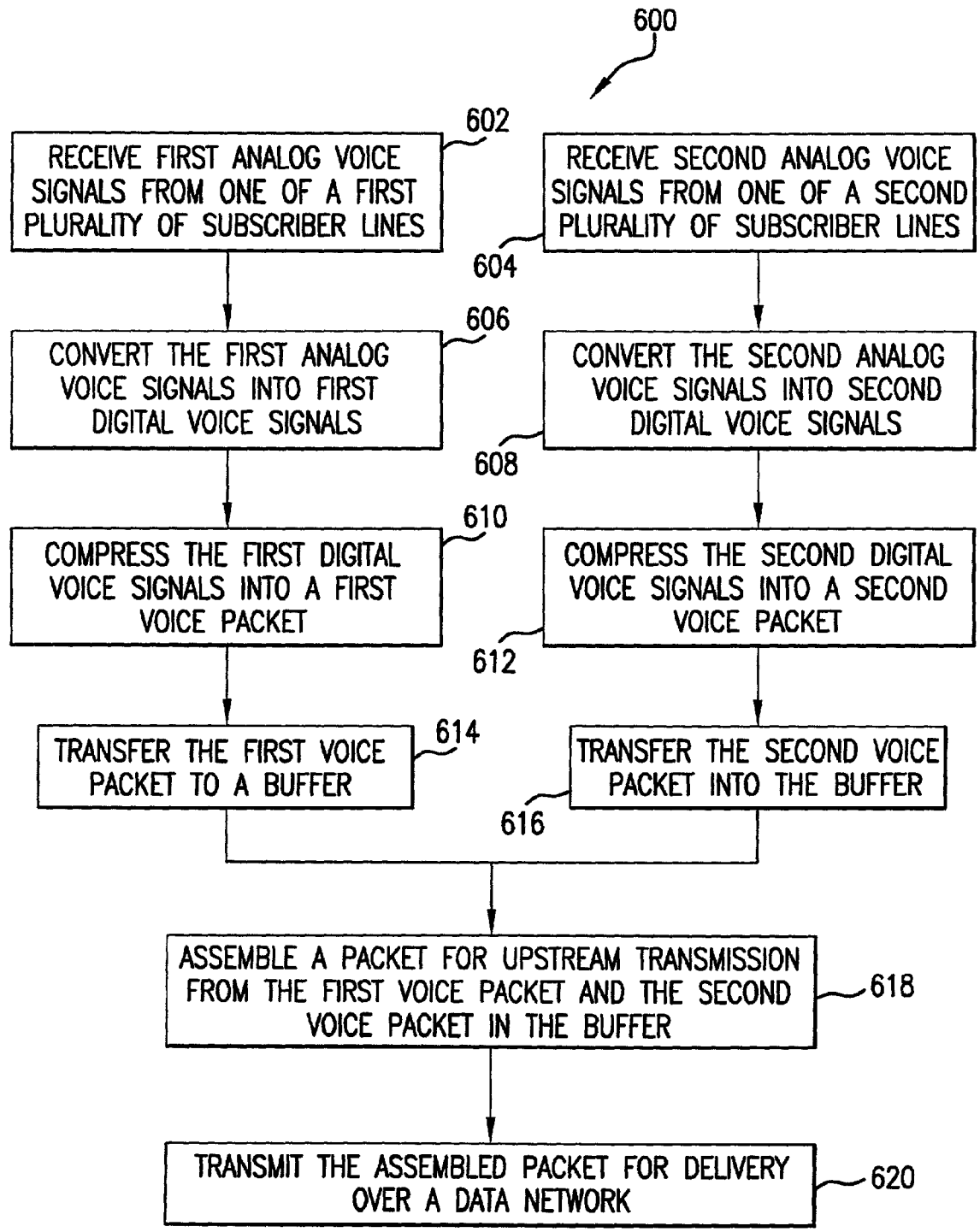
FIG. 6 is a flowchart showing a method for delay reduction in a telephony system in accordance with embodiments of the present invention.

FIG. 6 depicts a flowchart 600 of a method for delay reduction in an MDU telephony system in accordance with embodiments of the present invention. The invention, however, is not limited to the description provided by the flowchart 600. Rather, it will be apparent to persons skilled in the art from the teachings provided herein that other functional flows are within the scope and spirit of the present invention. The flowchart 600 will be now described with continued reference to the example MDU telephony system 230 depicted in FIG. 2C and FIG. 5.

At step 602, a first set of analog voice signals is received from one of a first plurality of subscriber lines. In the example MDU telephony system 230, this step is performed, for example, when the audio processing module 216 within the integrated VAPM and CM 208 receives analog voice signals from one of four subscriber lines via the SLICs 202a, 202b, 202c or 202d.

At step 604, a second set of analog voice signals is received from one of a second plurality of subscriber lines. In the example MDU telephony system 230, this step is performed, for example, when the audio processing module within the VAPM 206a receives analog voice signals from one of four subscriber lines via the SLICs 202e, 202f, 202g or 202h.

At step 606, the first set of analog voice signals are converted into first digital voice signals. In the example MDU telephony system 230, this step is performed, for example, when the audio processing module 216 within the integrated VAPM and CM 208 converts the analog voice signals received from one of four subscriber lines via the SLICs 202a, 202b, 202c or 202d into digital voice signals for transfer to the voice processing module 218.

At step 608, the second set of analog voice signals are converted into second digital voice signals. In the example MDU telephony system 230, this step is performed, for example, when the audio processing module within the VAPM 206a converts the analog voice signals received from one of four subscriber lines via the SLICs 202e, 202f, 202g and 202h into digital voice signals for transfer to the voice processing module 506 within the VAPM 206a.

At step 610, the first digital voice signals are compressed into a first voice packet. In the example MDU telephony system 230, this step is performed, for example, when the voice processing module 218 within the integrated VAPM and CM 208 compresses the digital voice signals received from the audio processing module 216 into a voice packet.

At step 612, the second digital voice signals are compressed into a second voice packet. In the example MDU telephony system 230, this step is performed, for example, when the voice processing module 506 within the VAPM 206a compresses the digital voice signals received from the audio processing module within the VAPM 206a into a voice packet.

At step 614, the first voice packet is transferred into a buffer. In the example MDU telephony system 230, this step is performed, for example, when the voice processing module 218 within the integrated VAPM and CM 208 transfers the generated voice packet to the transmission buffer memory 504 also within the integrated VAPM and CM 208. In embodiments, this transfer is a DMA transfer. Where DMA transfers are used, the host processor 502 provides a pointer to the voice processing module 218 in advance of this step that indicates the appropriate destination address in the transmission buffer memory 504.

At step 616, the second voice packet is transferred into the buffer. In the example MDU telephony system 230, this step is performed for example, when the voice processing module 506 within the VAPM 206a transfers the generated voice packet to the transmission buffer memory 504 within the integrated VAPM and CM 208. In embodiments, this transfer is a DMA transfer. Where DMA transfers are used, the host processor 502 provides a pointer to the voice processing module 506 in advance of this step that indicates the appropriate destination address in the transmission buffer memory 504.

As shown in FIG. 6, the method steps 602, 606, 610 and 614 may be performed in parallel with the method steps 604, 608, 612 and 616. As discussed in particular above, in embodiments of the present invention, the compression steps 610 and 612 are performed roughly simultaneously in order to reduce delay in the assembly and transmission of an assembled packet that will ultimately contain a voice packet from each voice processing module.

At step 618, a packet is assembled for upstream transmission from the first voice packet and the second voice packet in the buffer. In the example MDU telephony system 230, this step is performed, for example, when the host processor 502 assembles a packet in the transmission buffer memory 504 that includes a voice packet transferred from the voice processing module 218 and a voice packet transferred from the voice processing module 506. As discussed above, in the example MDU telephony system 230, a third voice packet may also included in the assembled packet from a third voice processing module. In accordance with embodiments of the present invention, any number of voice packets may be assembled for transmission using the techniques described herein, within the limits of the transmission system. For example, the limit on packet size imposed by TCP/IP is 1500 bytes.

At step 620, the assembled packet is transmitted for delivery over a data network. In the example MDU telephony system 230, this step is performed, for example, when the host processor 502 causes the assembled packet to be transferred from the transmission buffer memory 504 to the necessary upstream transmission equipment for transmission over the HFC network. In embodiments, the assembly of the voice packet is temporally aligned with the arrival of an assigned upstream burst opportunity, such that the assembled packet is transmitted during the assigned upstream burst opportunity that arrives after assembly has completed.

In accordance with the above-described system and method, a single DOCSIS upstream burst is used to transmit a plurality of telephone channels instead of one. Consequently, embodiments of the present invention will reduce the PHY and MAC level overhead per voice packet transfer and permit better upstream channel utilization. As will be appreciated by persons of ordinary skill in the art, although an embodiment of the present invention has been described in which three telephone channels are transmitted in a single burst, the invention is not so limited, and any number of telephone channels could be transmitted within the limitations of the transmission system.

Embodiments of the present invention also provide the additional benefit of reducing delay through a telephony system with multiple packet generators, such as those depicted in FIG. 2A, FIG. 2B, FIG. 2C and FIG. 5. For example, in a conventional telephony system utilizing a single voice processing module, the time required to assemble a packet for upstream transmission is the sum of the processing time for all channels concatenated. In contrast, in embodiments of the present invention, the processing time advance is only for that of one channel because each of the voice processing modules carries out its compression algorithm in parallel.

Another benefit of the above-described system and method is that the host processor 502 need only sustain the packet rate of the concatenated packets transferred from the voice processing modules 218, 506 and 508. The concatenated packet rate is one-third the rate of MDU telephony systems that do not use concatenation. Therefore, in embodiments of the present invention, it is possible for the host processor to be sized as though the system were one third smaller than conventional systems that do not use concatenation, resulting in a cost savings for a smaller, less capable processor system.

E. Conclusion

While various embodiments of the present invention have been described above, it should be understood that they have been presented by way of example only, and not limitation. For example, the present invention may be implemented in an MDU telephony system that supports Voice Over Internet Protocol (VoIP) telephones instead of POTS phones. Furthermore, the present invention is not limited to the delivery of packet telephony services over a cable modem system but may be implemented in any packet network system that has a reservation based transmission system. For example, the present invention may be implemented in a fixed wireless communication system.

Accordingly, it will be understood by those skilled in the art that various changes in form and details may be made to the embodiments of the present invention that have been described herein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A telephony system, comprising:
   a first voice processing module;
   a second voice processing module;
   a host processor coupled to said first and second voice processing modules; and
   a buffer coupled to said first voice processing module, said second voice processing module, and said host processor;
   wherein said first voice processing module is adapted to receive first digital voice signals from any one of a first plurality of subscriber lines, to compress said first digital voice signals to generate a first voice packet, and to transfer said first voice packet to said buffer by performing a first DMA transfer;
   wherein said second voice processing module is adapted to receive second digital voice signals from any one of a second plurality of subscriber lines, to compress said second digital voice signals to generate a second voice packet, and to transfer said second voice packet to said buffer by performing a second DMA transfer; and
   wherein said host processor is adapted to assemble a packet comprising said first voice packet and said second voice packet and to transmit said assembled packet for delivery over a data network.

2. The telephony system of claim 1, wherein said first voice processing module and said second voice processing module are further adapted to generate said first voice packet and said second voice packet in parallel.

3. The telephony system of claim 1, wherein said host processor is adapted to transmit said assembled packet for delivery over an HFC network.

4. The telephony system of claim 3, wherein said host processor is adapted to transmit said assembled packet for delivery over an HFC network during an assigned upstream burst opportunity.

5. The telephony system of claim 1, wherein said first voice processing module and said second voice processing module each comprise a digital signal processor.

6. The telephony system of claim 1, further comprising:
   a first audio processing module coupled to said first voice processing module; and
   a second audio processing module coupled to said second voice processing module;
   wherein said first audio processing module is adapted to receive first analog voice signals from any one of said first plurality of subscriber lines and to convert said first analog voice signals into said first digital voice signals, and
   wherein said second audio processing module is adapted to receive second analog voice signals from any one of said second plurality of subscriber lines and to convert said second analog voice signals into said second digital voice signals.

7. The telephony system of claim 6, further comprising:
   a first plurality of subscriber line interface circuits coupled to said first audio processing module; and
   a second plurality of subscriber line interface circuits coupled to said second audio processing module;
   wherein each one of said first plurality of subscriber line interface circuits is adapted to transmit analog voice signals from one of said first plurality of subscriber lines; and
   wherein each one of said second plurality of subscriber line interface circuits is adapted to transmit analog voice signals from one of said second plurality of subscriber lines.

8. The telephony system of claim 1, wherein said assembled packet comprises physical layer overhead, media access layer overhead, said first voice packet and said second voice packet.

9. The telephony system of claim 1, wherein said first DMA transfer and said second DMA transfer are segmented DMA transfers.

10. A telephony system comprising:
    a cable modem device, including a cable modem, a host processor and a buffer;
    a first processing module coupled to said cable modem device, wherein said first processing module includes a first voice processing module; and
    a second processing module coupled to said cable modem device, wherein said second processing module includes a second voice processing module;

wherein said first voice processing module within said first processing module is adapted to receive first digital voice signals from any one of a first plurality of subscriber lines, to compress said first digital voice signals to generate a first voice packet, and to transfer said first voice packet to said buffer in said cable modem device by performing a first DMA transfer;

wherein said second voice processing module within said second processing module is adapted to receive second digital voice signals from any one of a second plurality of subscriber lines, to compress said second digital voice signals to generate a second voice packet, and to transfer said second voice packet to said buffer in said cable modem device by performing a second DMA transfer; and wherein said host processor within said cable modem device is adapted to assemble a packet comprising said first voice packet and said second voice packet and wherein said cable modem within said cable modem device is adapted to transmit said assembled packet for delivery over a data network.

11. The telephony system of claim 10, wherein said first voice processing module within said first processing module and said second voice processing module within said second processing module are further adapted to generate said first voice packet and said second voice packet in parallel.

12. The telephony system of claim 10, wherein said first voice processing module within said first processing module and said second voice processing module within said second processing module each comprise a digital signal processor.

13. The telephony system of claim 10, wherein said first processing module further comprises a first audio processing module coupled to said first voice processing module;

wherein said second processing module further comprises a second audio processing module coupled to said second voice processing module;

wherein said first audio processing module is adapted to receive first analog voice signals from any one of said first plurality of subscriber lines and to convert said first analog voice signals into said first digital voice signals; and wherein said second audio processing module is adapted to receive second analog voice signals from any one of said second plurality of subscriber lines and to convert said second analog voice signals into said second digital voice signals.

14. The telephony system of claim 13, further comprising:
a first plurality of subscriber line interface circuits coupled to said first audio processing module; and
a second plurality of subscriber line interface circuits coupled to said second audio processing module;
wherein each one of said first plurality of subscriber line interface circuits is adapted to transmit analog voice signals from one of said first plurality of subscriber lines; and
wherein each one of said second plurality of subscriber line interface circuits is adapted to transmit analog voice signals from one of said second plurality of subscriber lines.

15. The telephony system of claim 10, wherein said assembled packet comprises physical layer overhead, media access layer overhead, said first voice packet and said second voice packet.

16. The telephony system of claim 10, wherein said first DMA transfer and said second DMA transfer are segmented DMA transfers.

17. A method for reducing delay in a telephony system, comprising:
receiving first digital voice signals from one of a first plurality of subscriber lines;
receiving second digital signals from one of a second plurality of subscriber lines;
compressing said first digital voice signals using a first voice processing module to generate a first voice packet;
compressing said second digital voice signals using a second voice processing module to generate a second voice packet;
transferring said first voice packet to a buffer, wherein transferring said first voice packet to said buffer comprises performing a first DMA transfer;
transferring said second voice packet to said buffer, wherein transferring said second voice packet to said buffer comprises performing a second DMA transfer;
assembling a packet comprising said first voice packet and said second voice packet; and
transmitting said assembled packet for delivery over a data network.

18. The method of claim 17, wherein said compressing said first digital voice signals and said compressing said second digital voice signals are carried out in parallel.

19. The method of claim 17, wherein said transmitting said assembled packet for delivery over a data network comprises transmitting said assembled packet for delivery over an HFC network.

20. The method of claim 17, wherein said transmitting said assembled packet for delivery over an HFC network comprises transmitting said assembled packet for delivery over an HFC network during an assigned upstream burst opportunity.

21. The method of claim 17, wherein said first voice processing module and said second voice processing module each comprise a digital signal processor.

22. The method of claim 17, further comprising:
receiving first analog voice signals from one of said first plurality of subscriber lines;
receiving second analog signals from one of said second plurality of subscriber lines:
converting said first analog voice signals into said first digital voice signals; and
converting said second analog signals into said first digital voice signals.

23. The method of claim 22, wherein said receiving said first analog voice signals from one of said first plurality of subscriber lines comprises receiving said first analog voice signals from one of said first plurality of subscriber lines via a first subscriber line interface circuit; and
wherein said receiving said second analog voice signals from one of said second plurality of subscriber lines comprises receiving said second analog voice signals from one of said second plurality of subscriber lines via a second subscriber line interface circuit.

24. The method of claim 17, wherein said assembled packet comprises physical layer overhead, media access layer overhead, said first voice packet and said second voice packet.

25. The method of claim 17, wherein said first DMA transfer and said second DMA transfer are segmented DMA transfers.

* * * * *